United States Patent
Heath

(10) Patent No.: US 9,810,568 B2
(45) Date of Patent: Nov. 7, 2017

(54) USE OF RESILIENT SEALS FOR HIGH TEMPERATURE AND/OR HIGH PRESSURE SEALING IN A GUIDED WAVE RADAR LEVEL MEASUREMENT DEVICE

(71) Applicant: Honeywell International Inc., Morristown, NJ (US)

(72) Inventor: Stuart James Heath, Surrey (CA)

(73) Assignee: Honeywell International Inc., Morris Plains, NJ (US)

(*) Notice: Subject to any disclaimer, the term of this patent is extended or adjusted under 35 U.S.C. 154(b) by 527 days.

(21) Appl. No.: 14/512,814

(22) Filed: Oct. 13, 2014

(65) Prior Publication Data
US 2016/0153820 A1  Jun. 2, 2016

(51) Int. Cl.
*G01S 13/88* (2006.01)
*G01F 23/284* (2006.01)
*G01S 7/28* (2006.01)
*H01Q 1/22* (2006.01)
*H01Q 13/08* (2006.01)
*G01S 13/10* (2006.01)

(52) U.S. Cl.
CPC .............. *G01F 23/284* (2013.01); *G01S 7/28* (2013.01); *G01S 13/88* (2013.01); *H01Q 1/225* (2013.01); *H01Q 13/08* (2013.01); *G01S 13/10* (2013.01)

(58) Field of Classification Search
CPC . G01S 7/28; G01S 13/10; G01S 13/88; G01F 23/284; H01Q 1/225; H01Q 13/08
USPC ....................................................... 342/124
See application file for complete search history.

(56) References Cited

U.S. PATENT DOCUMENTS

| | | | | |
|---|---|---|---|---|
| 2,457,052 A | * | 12/1948 | Le Clair | F16L 37/107 137/614.04 |
| 2,538,683 A | * | 1/1951 | Guiler | F16L 17/02 277/626 |
| 2,926,934 A | * | 3/1960 | Gill | F16L 37/23 137/614.04 |
| 4,834,139 A | * | 5/1989 | Fitzgibbons | E21B 33/0355 137/614.04 |
| 5,495,218 A | * | 2/1996 | Erb | H01P 1/08 333/248 |

(Continued)

FOREIGN PATENT DOCUMENTS

| | | |
|---|---|---|
| EP | 2 667 163 A1 | 11/2013 |
| WO | 2007043949 A1 | 4/2007 |

OTHER PUBLICATIONS

PCT International Search Report dated Jan. 5, 2016 for PCT/US2015/054346.

*Primary Examiner* — Peter Bythrow
(74) *Attorney, Agent, or Firm* — Kermit D. Lopez; Luis M. Ortiz; Ortiz & Lopez, PLLC

(57) ABSTRACT

A guided wave radar level measurement device includes a process connection composed of an outer conductor and a central conductor. The central conductor is surrounded at least in part by a dielectric material. One or more resilient metal seals can be employed to form a hermetic seal around a portion of the probe. The metal seal protects the dielectric material such that the hermetic seal is isolated from process and temperature shock. The metal seal(s) can be further mated with one or more insulators and one or more gaskets, the metal seal(s) to provide a thermal and mechanical barrier as well as offering chemical resistance to the guided wave radar level measurement apparatus.

20 Claims, 6 Drawing Sheets

(56) References Cited

U.S. PATENT DOCUMENTS

| | | | | |
|---|---|---|---|---|
| 5,955,684 A * | 9/1999 | Gravel | G01F 23/268 | 73/866.5 |
| 6,148,681 A * | 11/2000 | Gravel | G01F 23/268 | 73/866.5 |
| 6,247,362 B1 * | 6/2001 | Soroka | G01F 23/284 | 73/290 V |
| 6,325,391 B1 * | 12/2001 | Smith | G01F 23/284 | 277/312 |
| 6,642,807 B1 * | 11/2003 | Gard | G01F 23/268 | 333/24 R |
| 6,867,729 B2 | 3/2005 | Berry et al. | | |
| 7,255,002 B2 * | 8/2007 | Gravel | G01F 23/284 | 73/290 R |
| 7,450,055 B2 * | 11/2008 | Eriksson | G01F 23/284 | 342/124 |
| 7,636,059 B1 * | 12/2009 | Edvardsson | G01F 23/284 | 342/124 |
| 7,698,940 B2 * | 4/2010 | Osswald | G01F 23/284 | 73/304 C |
| 8,006,982 B2 * | 8/2011 | Whitlow | F16J 15/363 | 277/306 |
| 8,365,592 B2 * | 2/2013 | Osswald | G01F 23/00 | 73/290 R |
| 9,033,054 B2 * | 5/2015 | Curington | E21B 34/06 | 166/373 |
| 2002/0053238 A1 * | 5/2002 | Fahrenbach | G01F 23/284 | 73/290 R |
| 2004/0017200 A1 * | 1/2004 | Reimelt | G01F 23/284 | 324/439 |
| 2005/0150568 A1 * | 7/2005 | Dietmeier | G01F 23/00 | 141/95 |
| 2006/0225499 A1 * | 10/2006 | Gravel | G01F 23/284 | 73/290 V |
| 2007/0084281 A1 * | 4/2007 | Fredriksson | G01F 23/284 | 73/290 R |
| 2008/0134778 A1 * | 6/2008 | Osswald | G01F 23/284 | 73/304 C |
| 2009/0212996 A1 * | 8/2009 | Chen | H01Q 13/02 | 342/124 |
| 2009/0229359 A1 * | 9/2009 | Reimelt | G01F 23/284 | 73/304 R |
| 2010/0007097 A1 * | 1/2010 | Sundararajan | E21B 33/04 | 277/595 |
| 2010/0126288 A1 * | 5/2010 | Osswald | G01F 23/284 | 73/866.5 |
| 2010/0141505 A1 * | 6/2010 | Bergmann | G01F 23/284 | 342/124 |
| 2013/0314275 A1 * | 11/2013 | Fredriksson | G01F 23/284 | 342/124 |
| 2014/0103950 A1 * | 4/2014 | Janitch | G01F 23/284 | 324/754.06 |
| 2014/0125512 A1 * | 5/2014 | Janitch | G01F 23/284 | 342/124 |
| 2014/0242328 A1 | 8/2014 | Lopatin et al. | | |
| 2014/0266864 A1 * | 9/2014 | Fredriksson | G01F 23/284 | 342/124 |

* cited by examiner ized. It will further be appreciated that for simplicity and clarity of illustration, elements shown in the figures have not necessarily been drawn to scale. For example, the dimensions of some of the elements may be exaggerated relative to each other. Further, where considered appropriate, reference numerals may be repeated among the figures to indicate corresponding elements.

USE OF RESILIENT SEALS FOR HIGH TEMPERATURE AND/OR HIGH PRESSURE SEALING IN A GUIDED WAVE RADAR LEVEL MEASUREMENT DEVICE

FIELD OF THE INVENTION

Embodiments relate to guided wave radar devices and systems. Embodiments also relate to level measurement in guided wave radar applications. Embodiments further relate to guided wave radar applications capable of being deployed in high temperature and high pressure environments.

BACKGROUND

Level measurement using guided wave radar is used in a vast number of different applications. Products being measured range from relatively safe products such as water or grain to highly dangerous materials like ammonia or petrochemicals. The principle of measurement is that of a "time of flight" measurement of a short, high frequency pulse. This pulse is generated and interpreted by an electronic module that is connected to a wave guide in a tank who's level is being measured through a process connection. The waveguide can be a length of metal rope, a rod or a coaxial transmission line composed of a rod inside of a hollow metal tube.

The impedance of the transmission line changes at the interface of the medium being measured causing a reflection. This reflection returns to the electronics module and its flight time is used to calculate the level of material in the tank. The process connection serves many functions. One function of the process connection is to electrically connect the electronics, residing outside the tank, to the waveguide inside the tank. The electrical characteristics of the process connection are critical to proper performance of the device. The process connection in effect forms a coaxial transmission line composed of a central conductor and an outside concentric conductor. The space in between is filled with dielectric material, who's dielectric constant and physical dimension define the line's impedance. Materials used here are typically plastics and ceramics.

Another function of the process connector is to transfer axial load from the probe in the tank to the tank roof/wall. Features designed into the shape of the central conductor, dielectric material, and outer conductor are used to support and transfer loads exerted onto the waveguide by the material in the tank. The final and most important function of the process connector is to seal out the process, which can be at a high temperature and pressure.

Some designs, referred to as "dual seal" designs, incorporate redundant seals with a vent path. If the primary seal fails, there is a secondary, lower pressure seal, which allows the process to vent. The venting prevents the electronics housing from flooding and thus the conduit employed to run the communication/power cable to the gauge. The sealing of the process connection is especially challenging at high temperature and pressure.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide an improved guided wave radar level measurement device.

It is another aspect of the disclosed embodiments to provide a guided wave radar level measurement device that incorporates the use of resilient metal seals.

The aforementioned aspects and other objectives and advantages can now be achieved as described herein. A guided wave radar level measurement device is disclosed herein, which includes a probe composed of an outer conductor and a central conductor. The central conductor is surrounded at least in part by a dielectric material. One or more resilient metal seals can be employed to form a hermetic seal around a portion of the probe. The metal seal protects the dielectric material, such that the hermetic seal is isolated from process and temperature shock. The disclosed metal seal(s) can be further mated with one or more insulators and one or more gaskets. The metal seal(s) provide a thermal and mechanical barrier as well as offering chemical resistance to the guided wave radar level measurement device.

In some embodiments, the insulator may be a ceramic material and the gasket may be a graphite material. Additionally, in some embodiments, the dielectric material may form a dielectric sleeve formed from plastic material offering a low dielectric.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 6A-63 illustrate sectional B-B views of the guided wave radar level measurement device of FIG. 5, in accordance with an alternative embodiment;

DETAILED DESCRIPTION

Figure 1:
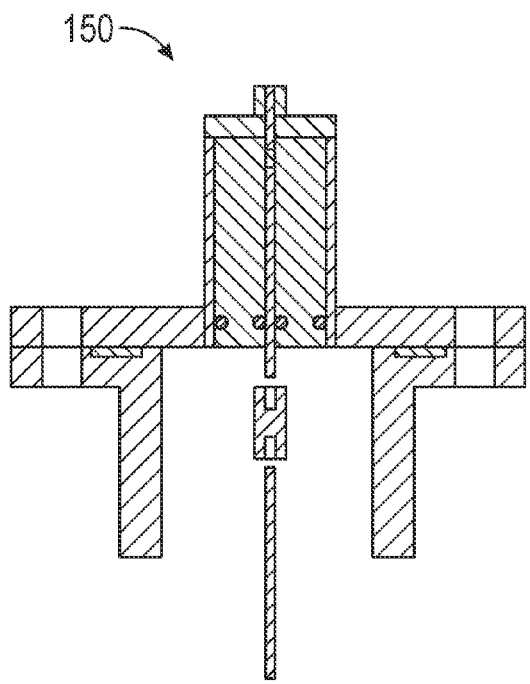
FIG. 1 illustrates a schematic diagram depicting a guided wave radar level measurement device, in accordance with a preferred embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Some applications of guided wave radar require the probe to be in contact with environments that are at high temperature and/or pressure. In addition, the materials involved can be corrosive. Current guided wave radar devices use elastomeric o-rings or graphite packing. Typical elastomeric seals have limited temperature ranges, can have chemical compatibility issues with some process materials, and are limited in their maximum pressure capabilities. To utilize elastomeric o-rings, many factors need to be considered and even then the maximum pressure still may not be sufficient.

To overcome some of these limitations, the disclosed embodiments incorporate the use of resilient metal seals. Such seals are effective in high temperature and high pressure extreme environments present in jet engines. Resilient metal seals are revolved open deformable metal sections that are process pressure energized. Depending on their material of construction, such seals can sustain temperatures in the thousands of degrees F. and pressures in the 10s of thousands of psi. Such can be configured from material such as, for example, C-276 which is very corrosion resistant.

As will be explained in greater detail herein, the disclosed guided wave radar level measurement device can be implemented in a generally cylindrical arrangement and includes one or more resilient metal seals along with at least one O-Ring ("Secondary Seal") and dielectric material (e.g., a dielectric sleeve, which is discussed in greater detail herein). The guided wave radar level measurement device additionally can include an outer conductor and a central conductor and seals generally configured in a concentric arrangement. The dielectric material helps to establish impedance with respect to an RF circuit transmission line. The disclosed embodiments are discussed in terms of a "process side" implementation.

Implementing a resilient metal seal is very much like that for a face seal elastomeric o-ring. The seals are simply dropped into an appropriately dimensioned gland and are retained by sufficiently strong, stiff, and smooth walls. Depending on the mating wall smoothness and metal seal coating material, gas seals with leak rates as low as, for example, 10^-11 cc/sec can be achieved. Without the temperature limitations of elastomeric seals, metallic seals can be implemented anywhere on the process connection. The resilient metal seals described herein can seal against plastic, ceramic, glass, and metal. The resilient metal seals act as a line of defense against the fluid or gas being measured. As will be demonstrated in greater detail herein, the seals provide for a secondary sealing requirement. The O-Rings discussed herein can allow in some embodiments for venting (via a vent hole) and thus assist in achieving secondary sealing.

In general, the disclosed guided wave radar level measurement device can include a hermetic seal that is isolated from process and temperature shocks. Pressure and outside forces on the probe will not affect the integrity of the seal. A flexible probe load and locking system can in some embodiments compensate for stress from thermal expansion and lateral and vertical forces. Such a system or assembly can also protect and fasten the ceramics. The guided wave radar level measurement device can further incorporate ceramic insulators and in some cases, graphite gaskets. Elements such as ceramic insulators and graphite gaskets on the temperature and pressure seal can assist in providing a robust thermal and mechanical barrier as well as offering chemical resistance.

FIGS. 1-8 illustrate varying views of a guided wave radar level measurement device 150 in accordance with preferred and alternative embodiments. Note that in FIGS. 1-8, identical or similar parts are indicated by identical or similar reference numerals.

FIG. 1 illustrates a schematic diagram depicting a guided wave radar level measurement device 150, in accordance with a preferred embodiment. The guided wave radar level measurement device 150 generally includes an inner conductor connected to a coax connector. A dielectric surrounds the inner conductor. Seals and welds are also incorporated into the device 150. The guided wave radar level measurement device 150 typically connects to a tank flange (not shown in FIG. 1).

Figure 2A:
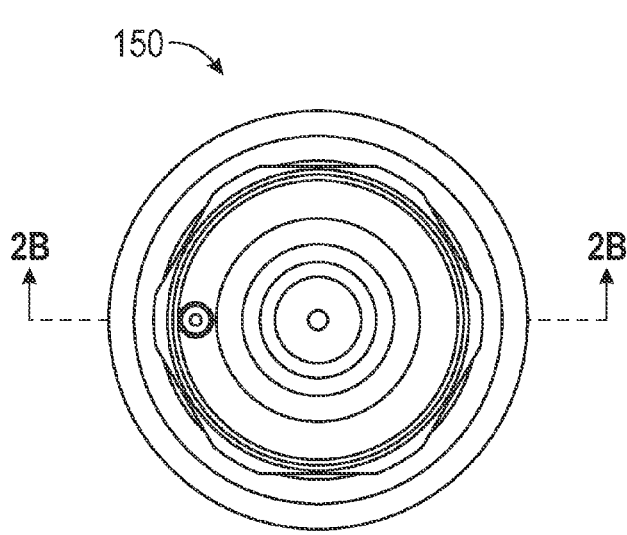
FIGS. 2A-2B respectively illustrate top and side sectional views of the guided wave radar level measurement device shown in FIG. 1, in accordance with a preferred embodiment.
Figure 2B:
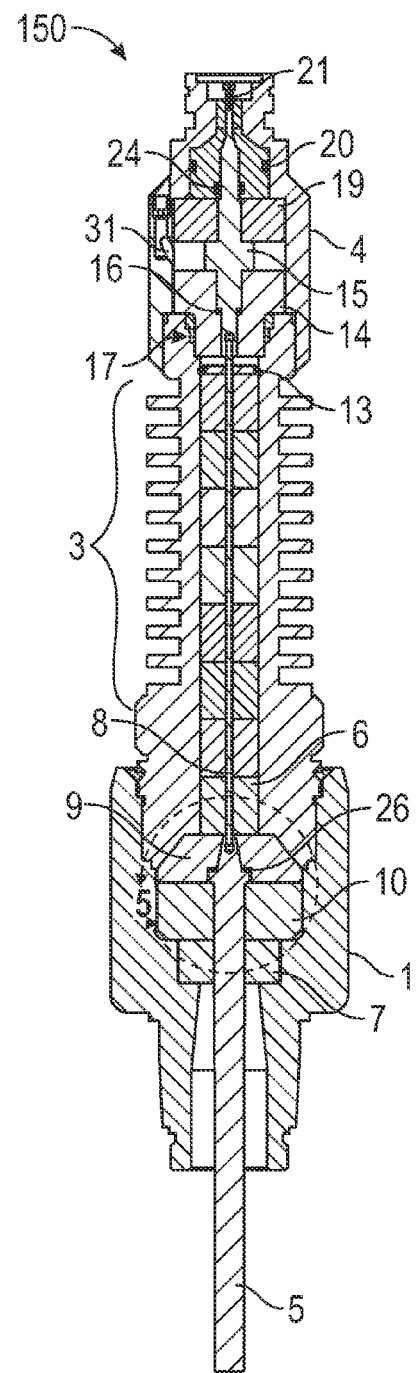

FIGS. 2A-2B respectively illustrate top and side sectional views of the guided wave radar level measurement device 150 shown in FIG. 1, in accordance with a preferred embodiment albeit with some variations. The device 150 generally includes the use of resilient metal seals such as seals 16, 17 in cooler regions where plastic resides. The temperature tends to drop approximately in the region of retaining ring 13. The device 150 incorporates a glass, ceramic, and plastic arrangement that allows for isolation of electronics from the process and the use of dielectric plastic material, which offer a lower dielectric than ceramic. This does not mean that ceramics or similar materials are excluded from the configuration, but are used in a manner that allows for the use of resilient metal seals in cooler regions where plastics of this type reside.

The guided wave radar level measurement device 150 includes a lower central conductor 5 that is surrounded and maintained at least in part by a lower body 1. The conductor 5 is surrounded by a glass component or glass ring 7 and a lower ceramic portion or ring 10 which is located adjacent a serrated washer 26. At least one ceramic spine 6 is located above a ceramic ring 9 which is located adjacent a ceramic ring 10. The ceramic spines including ceramic spine 6 are surrounded by a threaded body portion 3. A middle central conductor 8 connects to the lower central conductor 5. A processor connector cap 4, which is located at the top of the device 150 can maintain a lower load ring 14 and an upper load ring 19. A venting path 31 is located within the connector cap 4. The cap 4 also contains a T-shaped portion that constitutes the upper central conductor 15. Resilient metal seals 16, 17 are also shown in FIG. 2, but discussed in greater detail below along with reference to additional elements.

Figure 3:
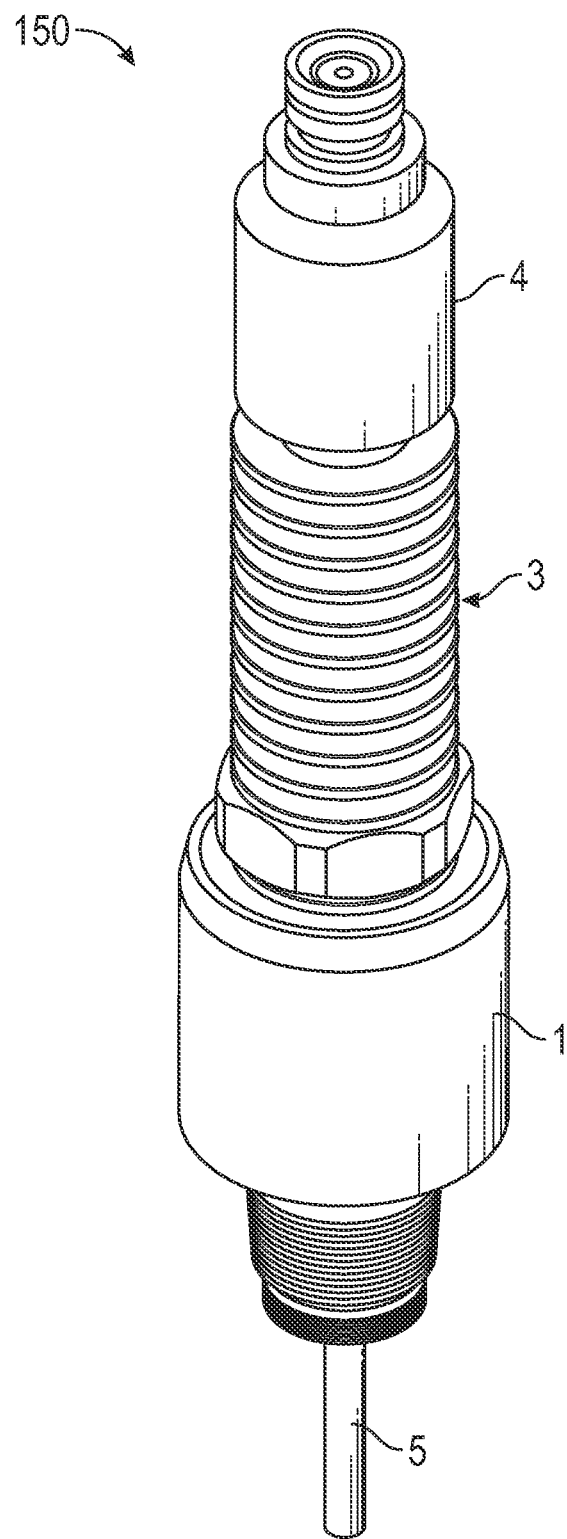
FIG. 3 illustrates an isometric view of the threaded body portion of a guided wave radar level measurement device, in accordance with a preferred embodiment.
Figure 4:
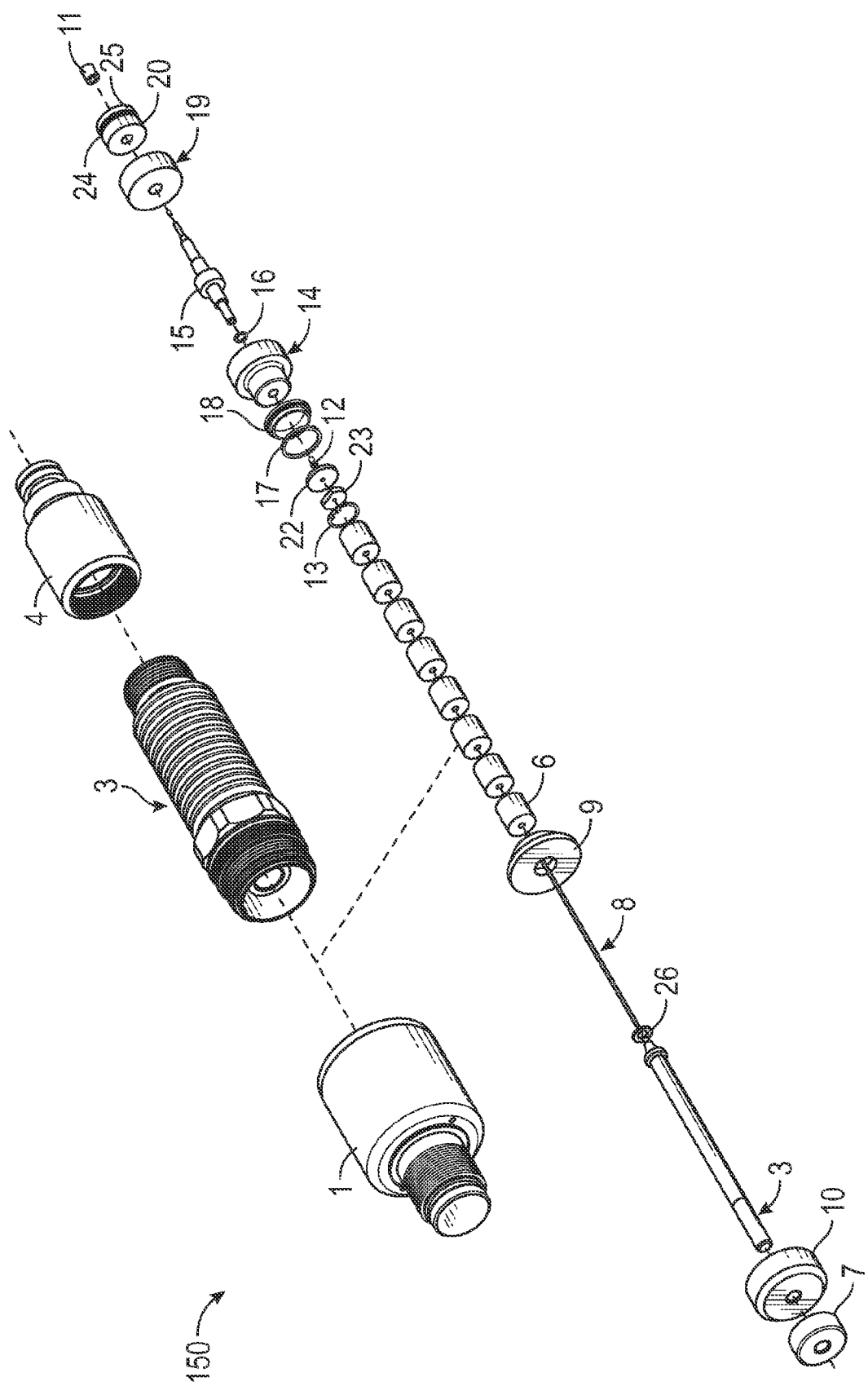
FIG. 4 illustrates an exploded view of the threaded body portion depicted in FIG. 3, in accordance with a preferred embodiment.
Figure 5:
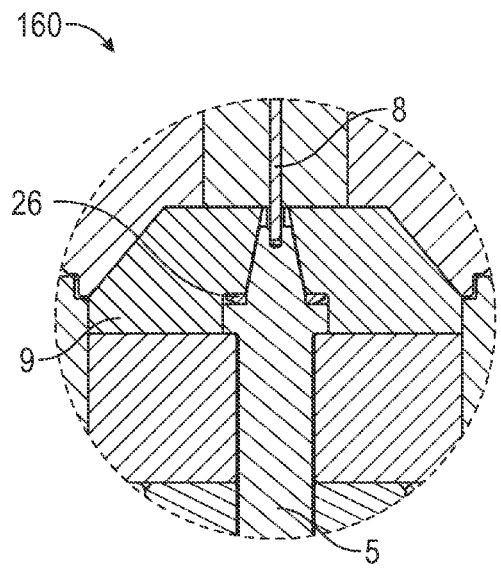
FIG. 5 illustrates a sectional detail view of a guided wave radar level measurement device, in accordance with an alternative embodiment.
Figure 6A:
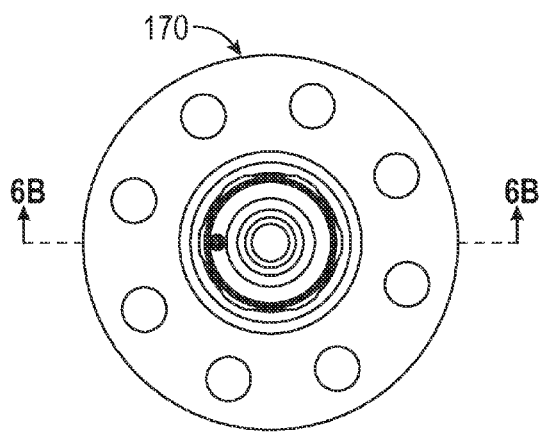
Figure 6B:
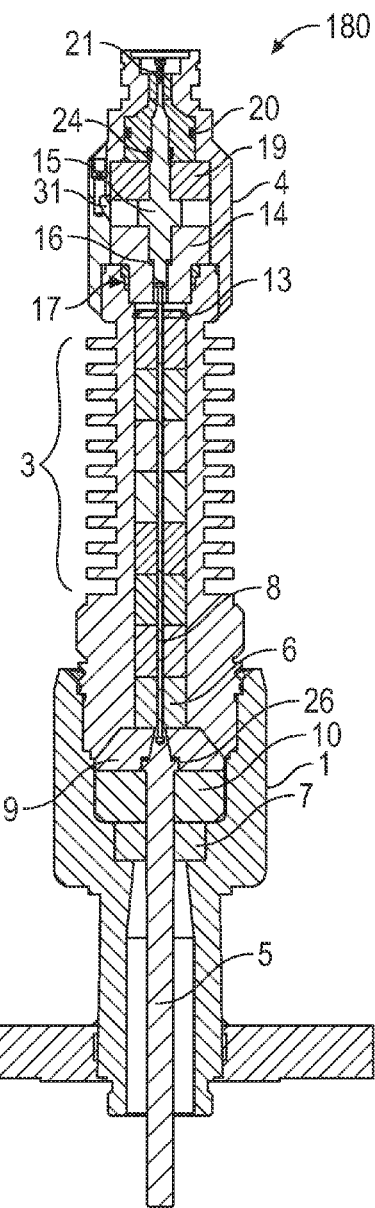

FIG. 3 illustrates an isometric view of the threaded body portion 3 of the guided wave radar level measurement device 150 shown in FIGS. 1 and 2A-2B. FIG. 4 illustrates an exploded view of the threaded body portion 3 depicted in FIG. 3. FIG. 4 illustrates an exploded view of the device 150 shown in FIG. 1-3. FIG. 5 illustrates a sectional view of the guided wave radar level measurement device 150. FIGS. 6A-6B illustrate respective top and side sectional views of the guided wave radar level measurement device

Figure 7:
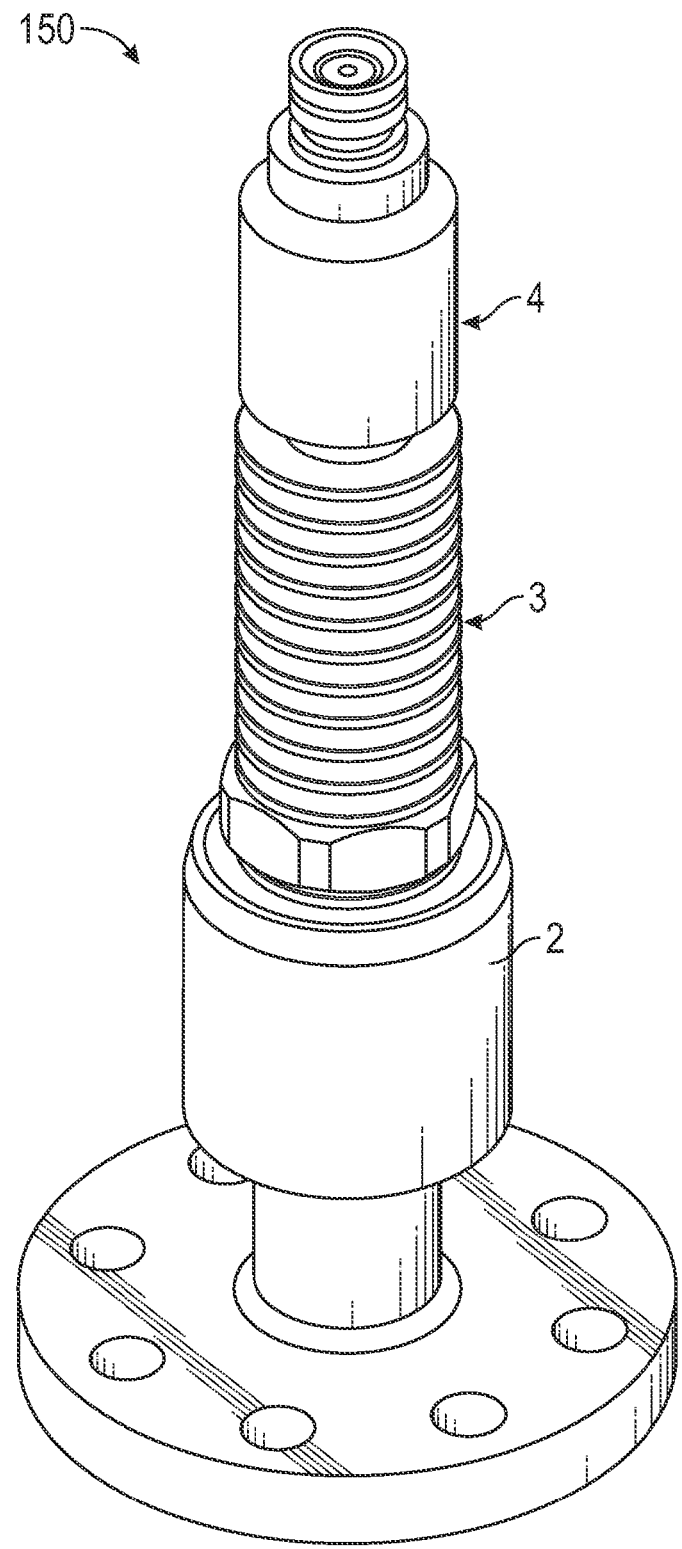
FIG. 7 illustrates an isometric flanged view of a flanged body portion of a guided wave radar level measurement device, in accordance with an alternative embodiment.
Figure 8:
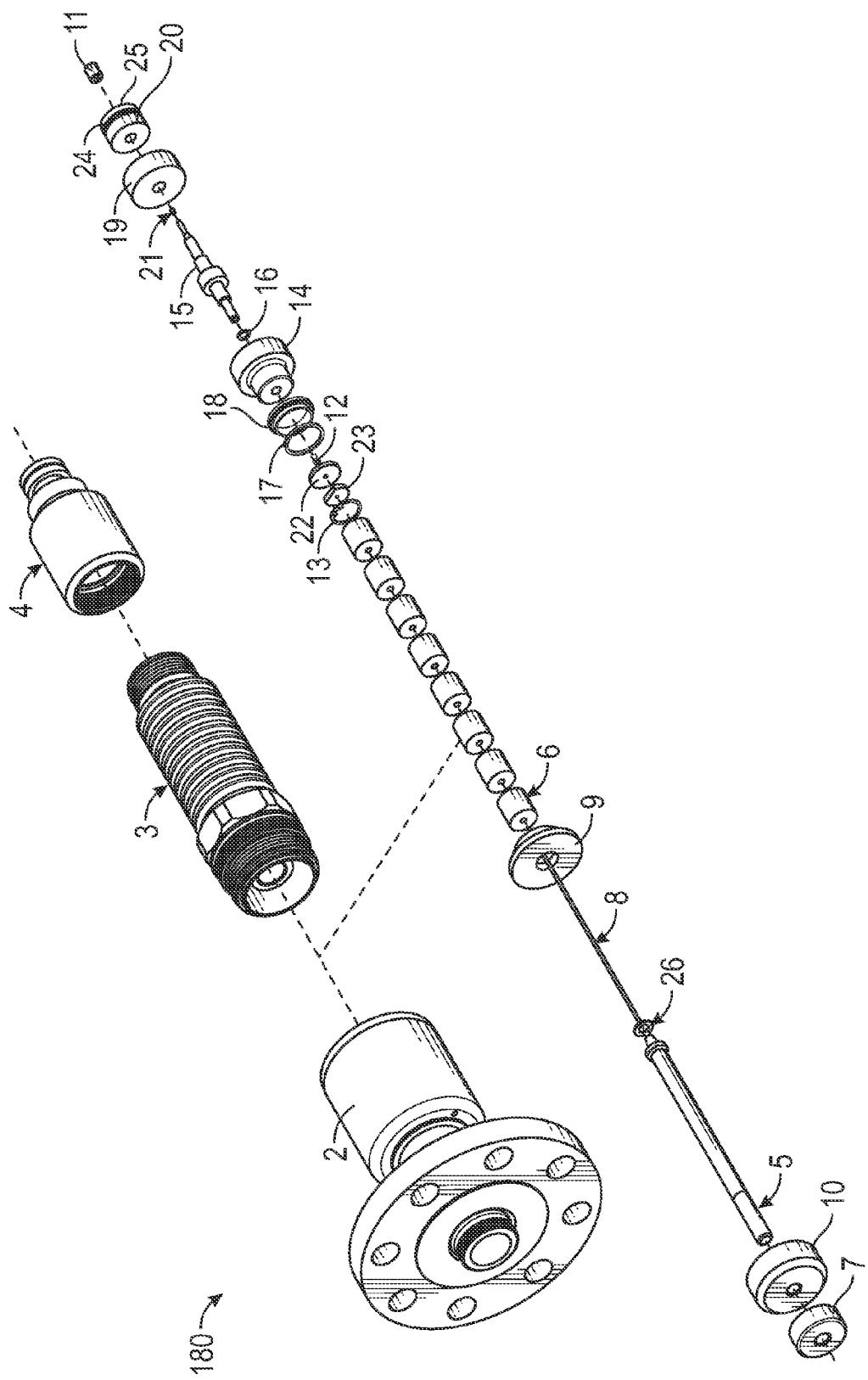
FIG. 8 illustrates an exploded view of the flanged body portion shown in FIG. 7, in accordance with an alternative embodiment.

150. FIG. 7 illustrates an isometric flanged view of the device 150 with the addition of a flanged body, in accordance with an alternative embodiment. Finally, FIG. 8 illustrates an exploded view of the flanged body portion of FIG. 7, in accordance with an alternative embodiment. Note the different between the configuration shown in FIGS. 5-8 and the other figures is the presence in FIGS. 5-8 of a flanged element or portion and a lower body 2 instead of a lower body 1. The other elements are essentially the same.

As shown in FIGS. 1-8, the guided wave radar level measurement device 150 generally includes a lower central conductor 5 (e.g., a probe) that extends from the bottom lower end and through the glass ring or glass element 7, which is located below or next to a lower ceramic ring 10. At least a portion of the lower body 1 can function as an outer conductor of the guided wave radar level measurement device 150. The "probe" of the device 150 is composed of the lower central conductor 5 which connects to the middle central conductor 8, wherein the central conductor is surrounded at least in part by dielectric material (e.g., the dielectric sleeve).

The lower body 1 maintains the glass ring 7, the lower ceramic ring 10, the serrated washer 26, the upper ceramic ring 9, and at least a portion of the conductor 5. A middle body 3 is located above the lower body 1. The middle body 3 surrounds a middle central conductor 8 (e.g., to which the probe is attached). The middle central conductor 8 is an extension of or is connected to the lower central conductor 5.

A ceramic ring 6 surrounds the middle central conductor 8. Washers 22, 23 are located next to a retaining ring 13 which surrounds a central bore therein. A pin receptacle 12 maintains at least a slight top portion of the middle central conductor 8. Resilient metal seals 16, 17 are co-located with a retaining ring or Gasket 18 about a lower load ring 14 which in turn maintains a central conductor 15 within a connector cap 4. An upper load ring 19 is also maintained with the connector cap 4 and adjacent to an O-ring 24 and an O-ring 20. A secondary seal body 25 is located beside a pin receptacle 21, which in turn is surrounded by a dielectric sleeve 11.

The upper load ring 19, the dielectric sleeve 11, and the secondary seal body 20 (with O-rings pre-installed) can be placed onto the upper central conductor 15. The pin receptacle 21 and 12 can be press fit into the upper central conductor 15 and then press fit into a bore of the lower load ring 14 after the inner resilient metal seal 16 is pressed in. The outer resilient metal seal 17 can then be press fit into the middle body 3. Here, steps should be carefully taken to not bottom out the seal 17. A seal retaining ring 18 can be screwed into middle body and then the lower load ring 14 can be press fit into the assembly.

Ceramic spines 6 can be inserted into the bore of the middle body 3. The retaining ring 13 can be inserted and secured into the groove on middle body 3. Then, washers 22, 23 can be inserted. The lower bodies 2 or 1 can also be welded to the middle body 3.

Based on the foregoing, it can be appreciated that a number of embodiments, preferred and alternative, are disclosed herein. For example, in one embodiment, a guided wave radar level measurement device can be implemented, which includes a probe comprising an outer conductor and a central conductor, wherein the central conductor is surrounded at least in part by a dielectric material. The guided wave radar level measurement device can further include one or more metal seals, which can form a hermetic seal around a portion of the probe. The dielectric material is protected by metal seal(s) such that the hermetic seal is isolated from process and temperature shocks. Additionally, the guided wave radar level measurement device can incorporate one or more insulators and one or more gaskets, such that metal seal(s) is mated with the insulator(s) and the one gasket(s) at the metal seal(s) to provide a thermal and mechanical barrier as well as isolating electronics of the guided wave radar level measurement device from the process and temperature shocks.

The metal seal(s) can be employed in cooler regions of the guided wave radar level measurement device wherein the plastic material resides. Additionally, the insulator(s) can be composed of a ceramic material. In some embodiments, the ceramic material may be configured as ceramic rings disposed in a spine arrangement with respect to the central conductor. In other embodiments, the gasket(s) may be composed of a graphite material. The resilient metal seal can seal against plastic, ceramic, glass, and metal. Additionally, the metal seal(s) can function as a line of defense against the fluid or the gas that is being measured by the guided wave radar level measurement device. In some embodiments, the metal seal(s) can be configured to include an O-Ring with a venting hole formed therein to assist in achieving a secondary sealing. The outer conductor can also be surrounded by a glass ring.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A guided wave radar level measurement device, comprising:
   a probe comprising an outer conductor and a central conductor, said central conductor surrounded at least in part by a dielectric material;
   at least two metal seals that form a hermetic seal around a portion of said probe, said dielectric material protected by said at least two metal seals such that said hermetic seal is isolated from process and temperature shocks; and
   at least one insulator and at least one gasket wherein said at least two metal seals are mated with said at least one insulator and said at least one gasket to provide a thermal and mechanical barrier as well as isolating electronics of said guided wave radar level measurement device from said process and temperature shocks.

2. The device of claim 1 wherein said dielectric material comprises a plastic material.

3. The device of claim 2 further comprising an upper load ring located above said at least two metal seals and wherein said central conductor comprises an upper central conductor located above said at least two metal seals and wherein said dielectric material forms a dielectric sleeve that surrounds a pin receptacle located beside a seal body, wherein said upper load ring, said dielectric sleeve, and said seal body are placed onto said upper central conductor.

4. The device of claim 2 wherein said guided wave radar level measurement device comprises cooler regions and warmer regions, wherein said cooler regions include said plastic material, wherein said at least two metal seals are utilized in said cooler regions of said guided wave radar level measurement device where said plastic material resides versus warmer regions of said guided wave radar level measurement device.

5. The device of claim 1 wherein said at least one insulator comprises a ceramic material.

6. The device of claim 5 wherein said ceramic material comprises at least three ceramic rings among a plurality of ceramic rings configured in a spine arrangement with respect to said central conductor.

7. The device of claim 1 wherein said at least one gasket comprises a graphite material.

8. The device of claim 1 wherein said at least two metal seals are co-located within a retaining ring about a load ring which in turn assists in maintaining said central conductor within a connector cap.

9. The device of claim 8 wherein said at least two metal seals assist in protecting internal components of said guided wave radar level measure device from being damaged by a fluid or a gas being measured by said guided wave radar level measurement device and wherein said connector cap contains a T-shaped portion that includes an upper central conductor of said central conductor.

10. The device of claim 8 further comprising an O-Ring with a venting hole formed therein that assists in providing a venting, which assists in preventing an electronics housing of said guided wave radar measurement device from being flooded if a primary seal thereof fails.

11. The device of claim 8 wherein said outer conductor is surrounded by a glass ring.

12. A guided wave radar level measurement device, comprising:
  at least two resilient metal seats and wherein said guided wave radar level measurement device includes a cooler region and a warmer region, wherein said cooler region includes a plastic material; and
  a conductor probe wherein a lower portion of said conductor probe is surrounded by a glass material, a central portion of said conductor is surrounded by a plurality of ceramic rings, and an upper portion of said conductor probe is surrounded by a plastic material, wherein said central portion is located between said lower portions and said upper portion, and wherein said at least two resilient metal seals are located in said cooler region of said guided wave radar level measurement device where said plastic material resides, said plastic material having a dielectric lower than that of said plurality of ceramic rings.

13. The device of claim 12 wherein said plurality of ceramic rings includes at least three ceramic rings configured in a spine arrangement with respect to said central portion of said conductor.

14. The device of claim 12 wherein said glass material, said plurality of ceramic rings, and said plastic material comprise a glass, ceramic, and plastic arrangement that allows for isolation of electronics within said device.

15. The device of claim 1 wherein said at least two resilient metal seals are co-located within a retaining ring about a load ring which in turn assists in maintaining said central conductor within a connector cap.

16. The device of claim 14 wherein said at least two resilient metal seals assist in protecting internal components of said guided wave radar level measure device from being damaged by a fluid or a gas being measured by said guided wave radar level measurement device and wherein said at least one resilient metal seal comprises an O-Ring with a venting hole formed therein that assists in providing a venting, which assists in preventing an electronics housing of said guided wave radar measurement device from being flooded if a primary seal thereof fails.

17. A method of configuring a guided wave radar level measurement device, comprising:
  providing a process connection comprising an outer conductor and a central conductor;
  surrounding said central conductor at least in part by a dielectric material;
  configuring at least two metal seals to form a hermetic seal around a portion of said probe, said dielectric material protected by said at least two metal seals such that said hermetic seal is isolated from process and temperature shocks; and
  mating said at least two metal seals with at least one insulator and at least one gasket to provide a thermal and mechanical barrier as well as isolating electronics of said guided wave radar level measurement device from said process and temperature shocks.

18. The method of claim 17 wherein said dielectric material comprises a plastic material.

19. The method of claim 17 guided wave radar level measurement device comprises cooler regions and warmer regions, wherein said cooler regions include a plastic material, and wherein said at least two metal seals are located in said cooler region of said guided wave radar level measurement device where said plastic material resides.

20. The method of claim 17 wherein said at least one insulator comprises a ceramic material and said at least one gasket comprises a graphite material and wherein said at least two metal seals are co-located within a retaining ring about a load ring which in turn assists in maintaining said central conductor within a connector cap.

* * * * *